March 16, 1965  K. KLEIN  3,173,233
PACKAGING MACHINE FOR THE FILLING OF PLASTIC FOIL TUBING
Filed July 10, 1961  2 Sheets-Sheet 1
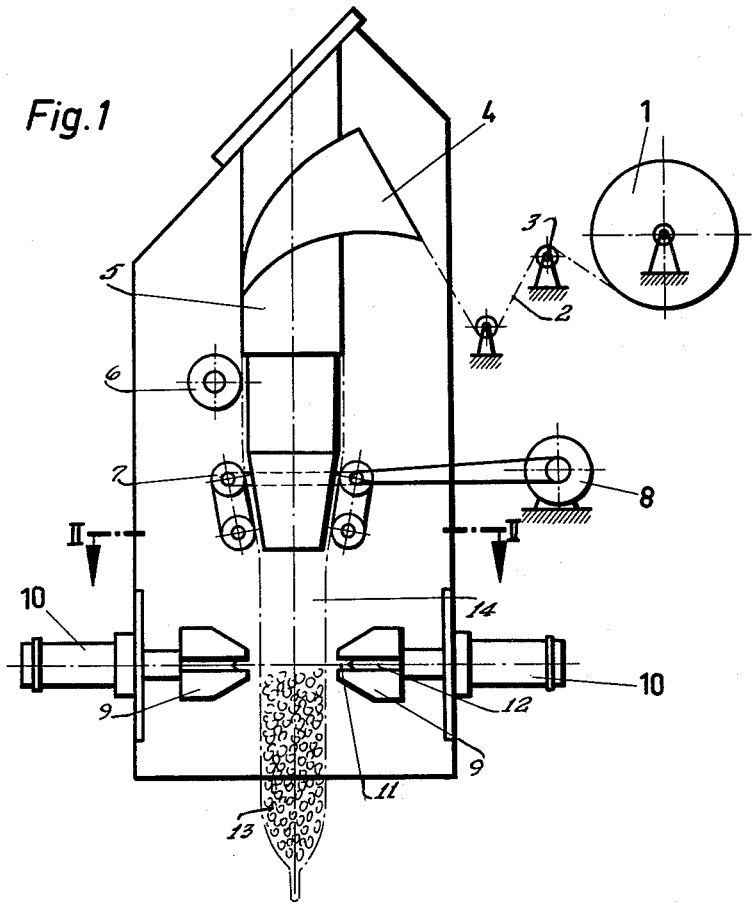
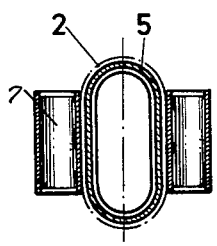
INVENTOR
Karl Klein
By Kurt Kelman
AGENT March 16, 1965 K. KLEIN 3,173,233
PACKAGING MACHINE FOR THE FILLING OF PLASTIC FOIL TUBING
Filed July 10, 1961 2 Sheets-Sheet 2

INVENTOR
KARL KLEIN
BY
Kurt Kelman
AGENT

United States Patent Office 3,173,233
Patented Mar. 16, 1965

3,173,233
PACKAGING MACHINE FOR THE FILLING OF PLASTIC FOIL TUBING
Karl Klein, Am Schiessrain, Ranstadt, Upper Hesse, Germany
Filed July 10, 1961, Ser. No. 122,684
Claims priority, application Germany, July 12, 1960, H 39,907
5 Claims. (Cl. 53—182)

This invention relates to a device for filling goods into plastic-foil tubing wherein the speed of the goods sensitive to pressure and impact can be controlled during the filling. Hence, it is an object of the invention to provide a packaging machine the so-called feed pipe of which can be cyclically tilted to vary its angle of inclination.

In the sales usage of today, for instance in self-service shops, it is current practice to offer vegetables sensitive to pressure, such as tomatoes or fruits such as apples or peaches, in bags of plastic film, for example polyethylene film, and it has been customary heretofore to fill the said bags manually in a time-consuming manner and to manually close them by an adhesive tape or the like.

This invention provides an apparatus for filling of the goods into tubing of plastic material with the aid of a feed pipe, the endless tubing running along the feed pipe, being welded across the longitudinal extension, filled, again welded transversely to form a package of the desired dimensions, and cut off as a complete and filled bag. The goods to be filled into the tubing are stored in a container from which they flow into the feed pipe and from there into the end of the plastic-film tubing, which is then cut off together with its contents and forms a package ready for sale.

It is therefore an object of this invention to pack goods sensitive to pressure and impact, such as fruit, for instance, apples, peaches etc. or vegetables, such as tomatoes, automatically and without manual work in a time-saving manner so that the said goods cannot suffer damage during the packing process.

It is another object of the invention to utilize the gravity of the said goods to let it be a continuous process in which the goods fall into the bag formed by the plastic-film tubing at the end of the feed pipe.

Another object of the invention is to control the flow speed of the goods dropping under their own gravity by cyclically tilting the feed pipe so that the flow of the goods is periodically softly braked to permit the goods to land gently in a bag at the lower end of the feed pipe.

A preferred embodiment of a machine for gentle filling of sensitive goods into plastic bags will be described with reference to the illustrations attached wherein FIG. 1 shows in schematic elevation view the principle of forming the plastic-film tubing around the feed pipe;

FIG. 2 is a section of the feed pipe, taken along the line II—II of FIG. 1;

Figure 3:
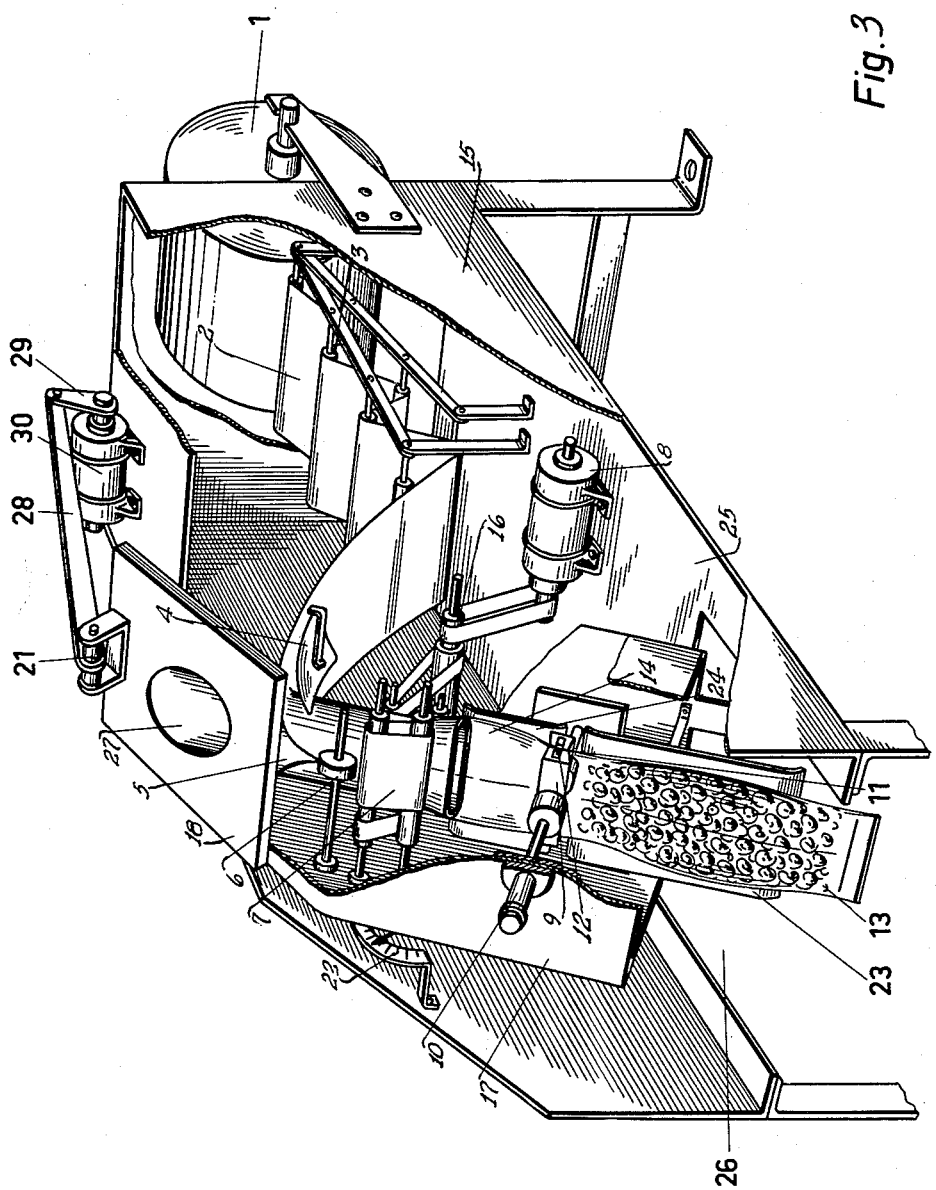
FIG. 3 is a cutaway perspective view of the packaging machine of the invention.

From the plastic-tape pay-out roll 1 in FIG. 1, the tape 2 is pulled over the rolls 3 in the rhythm of feeding and is formed, over the profiled sheet 4, into a tubing in which state it is further pulled over the feed pipe 5. The seam of this tubing is welded with the aid of the welding roll 6. The end of the feed pipe 5 which is suitably lined with soft rubber, extends into the tubing pull-off mechanism comprising two rollers 7 engaging with the feed pipe and the motor 8 driving these rollers at the desired pull-off speed. Arranged below the lower end of the feed pipe is the welding and cut-off equipment for the filled bags. The welding jaws 9 are closed by hydraulic cylinders 10 and are electrically heated. The slots 11 in the jaws contain the movable blades 12 by which the filled bags 13 are cut off from the tubing end 14 below the feed pipe whenever these blades are operated.

The arrangement described above and shown in FIGS. 1 and 2 is in FIG. 3 to be mounted in a machine stand 15 on a tiltable frame 17 journaled on the shaft 16. The walls of the frame and machine-stand walls are shown partly cut away to make the built-in parts visible. The shaft 16 on which the frame 17 is mounted for tilting movement, is also driven by motor 8 in the rhythm of bag production to operate the rollers 7. The feed pipe 5 with the tubing of plastic tape 2 sliding thereon, is fastened to a frame plate 18. A connecting rod 28 is attached at one end thereof by a joint 21 to the plate 18, while its other end is pivoted to a crank 29 driven by a motor 30, the latter being mounted on top of the stand 15. It will be apparent that when the motor 30 is in operation, the frame 17 will be cyclically tilted, together with the feed pipe 5 and the welding and cut-off device, through an angle around the shaft 16 as indicated by a scale 22 attached to the machine stand 15.

Supports 23 and 24 mounted on the frame 17 serve to support the plastic tubing with its contents when it comes off from the feed pipe 5. They consist of sheets arranged at both sides of the welding and cut-off device. The baseplate 25 of the machine stand 15 has a cutout 26 to provide clearance for the tilting movement of the frame 17.

The illustration does not show details which are not essential for the invention, for instance, windows in the machine-stand walls for convenient assembly, observation of operations and threading of the film tape over the rolls 3. The chute feeding the goods into the upper opening 27 of the feed pipe and the electrical equipment for power supply to the motors and control of the operating rhythm are likewise not shown, nor are means for varying the throw of the crank 29.

The machine operates as follows:

The rollers 7 are intermittently driven by the motor 8 and pull the foil tape from the pay-out spool 1 via rolls 3 and profiled sheet 4 upon the feed pipe 5 where it is welded by the weld roll 6 into a tubing having a longitudinal welded seam or seal. As soon as the tape-pulling rollers 7 stop, the welding and cutoff device becomes operative. The knives or blades 12 arranged in the welding jaws cut the filled bag off after both ends of the bag have been sealed-off by welding. Then the jaws 9 open, the feed pipe 5 fills a new charge into the tubing end 14, and the tubing simultaneously moves forward by an amount corresponding to the size of one bag and into the position identified by 13 in the drawing.

During each bag filling operation the frame 17 is cyclically tilted about the horizontal axis of the shaft 16 by the motor driven crank 29 and connecting rod 28, thus periodically imparting a soft braking action to the flow of goods through the feed pipe 5 and permitting the goods to land gently in the bag at the lower end of the pipe.

What I claim is:
1. A packaging machine for filling a tubular container with impact sensitive goods comprising, in combination:
(a) a support;
(b) frame means tiltable on said support about a horizontally extending axis;
(c) a feed pipe mounted on said frame means and having an axis;

(d) forming means for forming a continuous tubular container about said pipe means;

(e) means for advancing said container axially of said pipe means in a predetermined direction;

(f) closing means spaced from said pipe means in said predetermined direction for forming a closure in said container transverse of the axis of said feed pipe; and (g) drive means including a motor for cyclically tilting said frame about said horizontally extending axis during each package forming operation.

2. A machine as set forth in claim 1, wherein said forming means include means for wrapping a continuous sheet of material about said feed pipe, and sealing means mounted on said frame means for forming a seal in said material, said seal being elongated axially of said pipe.

3. A machine as set forth in claim 1, wherein said closing means include sealing means mounted on said frame means for forming an elongated seal in said container, said seal extending transversely of the axis of said feed pipe, and cut-off means for transversely cutting said container adjacent said seal.

4. A machine as set forth in claim 1, wherein said forming means include means for wrapping a continuous sheet of weldable thermoplastic material about said feed pipe, and first welding means for forming in said material a weld elongated axially of said pipe, whereby said sheet is made into a tubular body; and said closing means include second welding means mounted on said frame means for forming in said tubular body a weld elongated transversely of said pipe axis and connecting opposite portions of said body, and cut-off means for transversely cutting said body adjacent said transversely elongated weld.

5. A machine as set forth in claim 1, wherein said motor is mounted on said support, and said drive means includes eccentric motion transmitting means interposed between said motor and said frame means for cyclically tilting said frame means on said support.

References Cited by the Examiner
UNITED STATES PATENTS

| | | | |
|---|---|---|---|
| 1,986,422 | 1/35 | Zwoyer | 53—180 X |
| 2,899,875 | 8/59 | Leasure | 53—180 X |
| 2,969,627 | 1/61 | Leasure | 53—182 X |

FRANK E. BAILEY, *Primary Examiner.*

ROBERT A. LEIGHEY, *Examiner.*